Sept. 23, 1952     R. E. HERRICK     2,611,369

ALBUM PHOTO HOLDER OR MOUNTING

Filed March 8, 1948

*INVENTOR.*
R. E. HERRICK
BY
*A. Yates Dowell*
ATTORNEY

Patented Sept. 23, 1952

2,611,369

UNITED STATES PATENT OFFICE 2,611,369

ALBUM PHOTO HOLDER OR MOUNTING

Robert E. Herrick, Brooklyn, N. Y.

Application March 8, 1948, Serial No. 13,658

7 Claims. (Cl. 129—20)

This invention relates to photography and more particularly to the orderly preservation and display of photographs and the convenient storage of negatives from which the prints or photographs are made.

The invention particularly contemplates a photograph album including sheets or leaves to which mounts are adapted to be attached for holding prints or photographs of varying sizes as well as the negatives from which the prints or photographs were made.

Photographs or prints have been kept in various ways including in photograph albums. Frequently they have been loosely contained in the album or mounted in the album in some insecure manner, as for example, by corner mounts or the like with relatively small portions having adhesive so that the attachment of the photographs has been unsatisfactory. Also slits have been employed in which the corners of photographs have been inserted. This means likewise has not proven fully satisfactory. With such unsatisfactory mounting pictures have been lost.

Further, it has been customary to have the album with the photographs therein kept in one place and the negatives filed in a separate place. The result has been that either one or the other was easily lost.

It has also been customary to write descriptive matter relative to the photograph in white ink on the black paper of the album or on the photograph itself, thereby defacing the same. However, if it became desirable to replace the photograph with another or to exchange the position of photographs in the album, erasures produced substantial problems if they did not in fact ruin the appearance of the complete page. Other types of albums also have been subject to criticisms for similar reasons.

It is an object of the invention to provide a photograph album with photograph mounting and holding or containing means for maintaining the negative from which the photograph was made conveniently located relative to or in association with the photograph; to provide a mounting means in the form of a holder of simple inexpensive and artistic appearance which can be modified to accommodate photographs of varying sizes, and by means of which descriptive matter can be easily added or removed.

Figure 1:
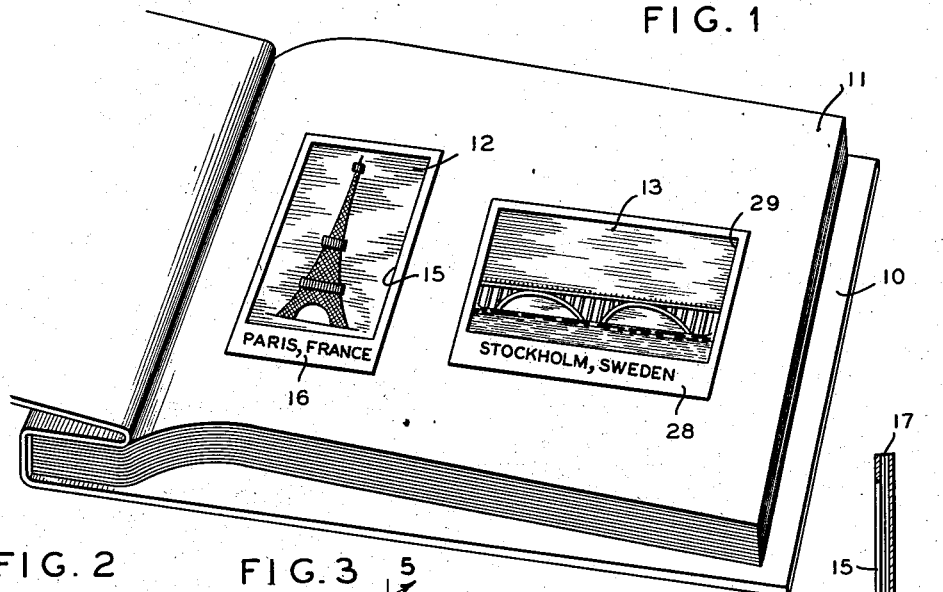
Figure 2:
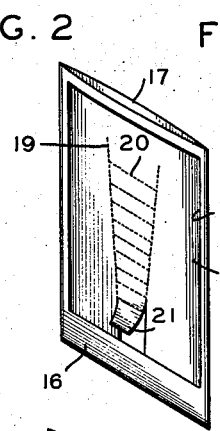
Figure 3:
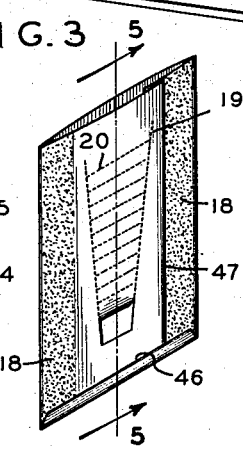
Figure 4:
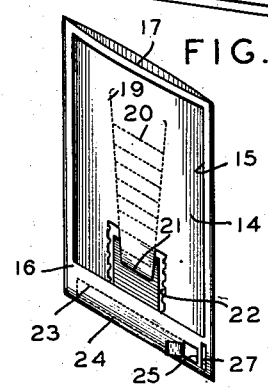
Figure 5:
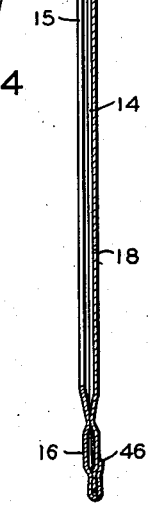
Figure 6:
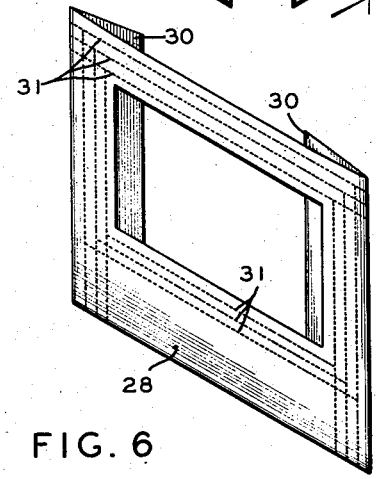
Figure 7:
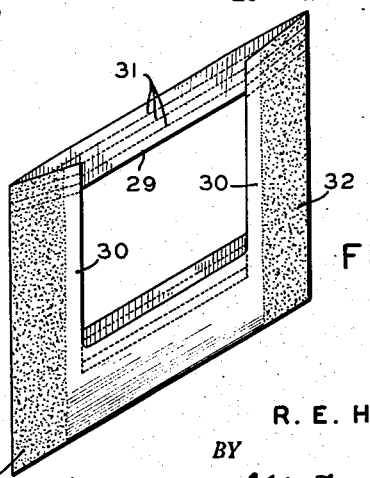

Further objects and advantages of the invention will be apparent from the following description taken in conjunction with the accompanying drawings, wherein:

Fig. 1 is a fragmentary perspective view of an album in accordance with the present invention;

Fig. 2, an isometric view of the front of one application of the invention;

Fig. 3, a similar view of the rear;

Fig. 4, an isometric of the front of a modified form of frame type mount or holder;

Fig. 5, a section on the line 5—5 of Fig. 3;

Fig. 6, an isometric view of the front of a further modified picture frame mount; and Fig. 7, an isometric view of the rear of the mount of Fig. 6.

With continued reference to the drawings, a photograph album 10 containing leaves 11 is employed for displaying photographs 12 and 13 of any desired size and shape. Mounting means for the photographs may be attached to such leaves or sheets as shown.

The mounting means may comprise a holder or envelope having relatively thin body 14 with an opening or window 15 through which a photograph or print, such as the print 12 may be retained therein in a manner to be readily viewed. The portion of the holder beneath the window, as shown particularly in Figs. 2 and 4, is relatively wide to provide a title receiving portion 16. The lower end of the body or holder 14 is closed while the upper end is provided with an opening 17 through which photographs or prints and negatives may be inserted. Thus there is provided a holder with a window in its front face, an open upper end for the insertion of photographs and negatives, and a relatively wide lower marginal portion on which the title may be placed. The holders of Figs. 2, 3 and 4 may be formed of a single sheet of material with flaps 46 and 47 or may be molded if desired.

Rear side portions 18 of the holder are provided with adhesive by means of which the holder may be attached to the leaf 11 of the album 10, regardless of whether the longer axis of the holder is in vertical or horizontal position.

The holder thus described may be used for retaining a photograph and its negative and at the same time attractively and advantageously displaying the same. If the photograph and negative are of similar size, the negative may be conveniently retained within the holder behind the photograph. However, when the photograph is a substantial enlargement, the relatively small negative from which it is produced is likely to become lost. Accordingly means is desirable for retaining a negative in place. As shown in Figs. 2, 3 and 4, longitudinal and transverse weakened lines or perforations 19 and 20, respectively, in the back of the holder may be employed for providing a graduated negative retaining structure. The distance between the lines 19 increases from the lower end of the holder and by detaching the material of the holder at the lower end along the longitudinal and transverse lines, a flap 21 is provided for retaining a negative 22, the amount of detachment or severance on the longitudinal lines being in proportion to the size of the negative held.

When the holder is used for mounting a photograph or print it may be attached by the adhesive to a page of the album and may have the title on the lower title receiving portion of the holder. In order to increase the flexibility or usefulness of the device weakened lines 23, 24 and 25 may be provided and by detaching the material of the holder the title on the lower portion of the photograph within the holder may be viewed through the slot by the material detached. Thereafter through a slot 27 a title strip may be inserted if subsequent change of photographs and titles is desired. As shown particularly in Fig. 5 the material in the holder at the lower portion of the window may be provided with an attaching line of adhesive or the like to separate the title receiving portion from the remainder of the holder.

In Figs. 6 and 7 a modified type of holder is disclosed. This holder consists of a body 28 having a window 29 in its front portion and a window 30 in its rear portion. The size of the window 29 can be varied or enlarged to accommodate a larger photograph or print such enlargement being made possible by the use of weakened lines or perforations 31 which extend along the top bottom and sides of the window. A space is provided along the lower portion of the front of the holder for receiving an appropriate title. The holder is provided with adhesive 32 along its rear sides and by means of which the holder may be attached to a leaf or page of the photograph album.

The holder just described and also the holder of the preceding figures may receive a photographic print or a card having a photograph thereon with the photographic portion smaller than the overall size of the card so that the window 29 will form an attractive distinctive frame therefor, and at the same time negatives may be preserved behind the photographs or prints in the single holder or container thus avoiding separation and loss. Adhesive may also be applied on the rear side of the body beneath the window.

It will be readily understood that by the present invention there is provided a simple, inexpensive, attractive and artistic holder for photographs, accompanying negatives, data cards, and sheets which may be used in an album for keeping the negatives and data cards or sheets from being lost or separated from the photographs, and which holders enhance the appearance and display of the photographs.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. The combination in an album of a supporting sheet for use with other sheets of a similar character, a combination photograph and negative holder for attachment to said sheet and comprising a body of relatively thin sheet material having a window therethrough which a photograph contained within the holder may be observed with the body around said window defining a frame for such photograph, said holder being constructed with flaps overlying portions of said body, adhesive on said flaps for securing said holder to said supporting sheet, said holder having diverging longitudinally disposed weakened lines in one of said flaps intersecting transversely disposed lines defining lines of separation so that a negative holding flap may be formed for engaging and holding the negative from which the photograph was made with excessive segments of the negative holding flap being detachable along said transverse lines, said holder also having a title-receiving portion beside said window and spaced parallel lines therein so that a strip may be detached to form a second long and narrow window to permit a title to be viewed therethrough, said holder also having a slit adjacent an end of said second window through which slit a title strip may be inserted carrying a title to be displayed.

2. The combination in an album of a supporting sheet for use with other sheets of a similar character, a photograph holder for attachment to said sheet and comprising a body of relatively thin sheet material having a window through which a photograph contained within the holder may be observed with the body around said window defining a frame for said photograph, said holder having flaps overlying portions of said body, adhesive on said flaps for securing said holder to said supporting sheet, said flaps having diverging longitudinally disposed weakened lines and intersecting transversely disposed lines defining lines of separation so that a negative holding flap may be formed for engaging and holding a negative from which the photograph was made and with excessive segments of the negative holding flap being detachable along said transverse lines, said holder also having a title-receiving portion beside said window.

3. A photograph holder for attachment to a supporting sheet and comprising a body of relatively thin sheet material having a window therein through which a photograph contained within the holder may be observed, the portion of the body around said window defining a frame for said photograph, said body having flaps overlying portions of said body, adhesive on said flaps for securing the same to a supporting sheet, diverging longitudinally disposed weakened lines and intersecting transversely disposed weakened lines in one of said flaps defining lines of separation so that a negative holding flap may be formed for engaging and holding the negative from which the photograph was made, and with excessive segments of the flap being detachable along said transverse lines.

4. The combination of a supporting sheet for use with other sheets of a similar character, a photograph holder for attachment to said sheet and comprising a body of relatively thin sheet material having a window through which a photograph contained within the holder may be observed, said body having overlapping flaps, adhesive on said flaps for securing them together, adhesive on at least one of said flaps for securing said holder to a supporting sheet, said flaps forming a back wall having diverging longitudinally disposed weakened lines and intersecting transversely disposed lines defining separation lines so that a negative holding flap may be formed for engaging and holding a negative, said transverse lines permitting detachment of excessive segments of said flap.

5. A photo and negative holder comprising a body formed of sheet material folded on itself to form an envelope having a back and a front, open at one end and closed at the other end, a window formed in the front to expose a photo positioned in the envelope, weakened longitudinal lines formed in the back, weakened transverse lines formed in the back and extending between said longitudinal lines whereby upon selective severance along these weakened lines a flap of any desired length may be formed for retaining a negative between said flap and the closed end of the envelope, and thereafter the photo may be inserted through the open end to retain the flap in position for preventing loss of the negative.

6. A photo holder comprising a body formed of sheet material to provide an envelope having a back and a front open at one end and closed at the other end, a window formed in the front to expose a photo positioned in the envelope, weakened longitudinal diverging lines formed in the back and extending from the closed end to the open end of said envelope whereby upon severance along these weakened lines a flap of any desired length may be formed for retaining a negative between said flap and the closed end of said envelope, and thereafter the photo may be inserted through the open end thereby retaining the flap in position for preventing loss of the negative.

7. A photo holder comprising a body formed of sheet material to provide an envelope having a back and a front open at one end and closed at the other end, a window formed in the front to expose a photo positioned in the envelope, weakened longitudinal diverging lines formed in the back and extending from the closed end to the open end of said envelope whereby upon severance along these weakened lies a flap of any desired length may be formed for retaining a negative between said flap and the closed end of said envelope, and thereafter the photo may be inserted through the open end thereby retaining the flap in position for preventing loss of the negative, and other weakened intersecting lines being provided on the front of said envelope whereby upon severance along the other weakened lines an additional portion of the photo may be viewed.

ROBERT E. HERRICK.

REFERENCES CITED

The following references are of record in the file of this patent:

UNITED STATES PATENTS

| Number | Name | Date |
| --- | --- | --- |
| 169,186 | Mosher | Oct. 26, 1875 |
| 1,261,133 | Kidd | Apr. 2, 1918 |
| 1,550,211 | Euwer | Aug. 18, 1925 |
| 1,593,301 | Havemeyer | July 20, 1926 |
| 2,193,296 | Pienzak | Mar. 12, 1940 |
| 2,323,532 | Fuller | July 6, 1943 |

FOREIGN PATENTS

| Number | Country | Date |
| --- | --- | --- |
| 59,906 | Switzerland | May 3, 1912 |
| 501,274 | France | 1920 |
| 111,449 | Sweden | 1944 |